US010370127B1

(12) United States Patent
Michael et al.

(10) Patent No.: US 10,370,127 B1
(45) Date of Patent: Aug. 6, 2019

(54) APPARATUS FOR ALIGNING AND CONNECTING SIGNAL CONNECTORS ON TWO DIFFERENT BODIES

(71) Applicant: United States of America as represented by the Administrator of NASA, Washington, DC (US)

(72) Inventors: Richard Michael, Lanham, MD (US); Thomas J. Hanyok, Lanham, MD (US); Beth A. Keer, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/143,833

(22) Filed: Sep. 27, 2018

(51) Int. Cl.
| H01R 13/62 | (2006.01) |
| B64G 1/64 | (2006.01) |
| H01R 13/502 | (2006.01) |
| H01R 13/631 | (2006.01) |
| H01R 25/00 | (2006.01) |

(52) U.S. Cl.
CPC ........... B64G 1/641 (2013.01); H01R 13/502 (2013.01); H01R 13/631 (2013.01); H01R 25/006 (2013.01)

(58) Field of Classification Search
CPC ................................................... H01R 13/629
USPC ................................................. 310/310, 364
See application file for complete search history.

(56) References Cited

U.S. PATENT DOCUMENTS

| 2,703,870 | A | * | 3/1955 | Minto | H01R 13/523 439/205 |
| 4,083,619 | A | * | 4/1978 | McCormick | H01R 13/62 439/310 |
| 4,820,183 | A | * | 4/1989 | Knapp | H01R 43/26 439/152 |
| 5,111,360 | A | * | 5/1992 | Baba | B60R 11/0241 361/727 |
| 5,205,753 | A | * | 4/1993 | Butterfield | H01R 13/62905 439/157 |
| 5,292,267 | A | * | 3/1994 | Kobayashi | G06F 1/1632 439/247 |
| 5,504,991 | A | * | 4/1996 | Parmley, Sr. | B60S 5/06 29/825 |
| 5,633,782 | A | * | 5/1997 | Goodman | G06F 1/1628 248/456 |
| 6,275,385 | B1 | * | 8/2001 | Sahara | H05K 5/0039 361/679.54 |
| 6,974,341 | B2 | * | 12/2005 | Jennings | E21B 33/0385 439/140 |
| 7,301,356 | B2 | * | 11/2007 | Machado | G01R 31/2808 324/750.16 |
| 8,246,372 | B1 | * | 8/2012 | Walters | H01R 13/622 439/310 |

(Continued)

Primary Examiner — Neil Abrams
(74) Attorney, Agent, or Firm — Matthew F. Johnston; Bryan A. Geurts; Mark P. Dvorscak

(57) ABSTRACT

An apparatus to align and connect complementary signal connectors on two different bodies comprises a housing having a housing support structure, a front side and a rear side. A first drive system on one body is used to operate a threaded shaft to join the two bodies. A second drive system that includes a rotatable shaft that is used to drive a cam to advance a signal connector panel on the one body to connect to a signal connector on the other body.

20 Claims, 15 Drawing Sheets

(56) References Cited

U.S. PATENT DOCUMENTS 9,246,270 B2 * 1/2016 Toratani ............ H01R 13/6275

* cited by examiner

APPARATUS FOR ALIGNING AND CONNECTING SIGNAL CONNECTORS ON TWO DIFFERENT BODIES

ORIGIN OF INVENTION

The invention described herein was made by an employee of the United States Government, and may be manufactured and used by or for the Government for governmental purposes without the payment of any royalties thereon or therefor.

CROSS REFERENCE TO OTHER PATENT APPLICATIONS

None.

FIELD OF THE INVENTION

The present invention relates to an apparatus that aligns and connects mating connectors on two different bodies, such as independent spacecraft.

BACKGROUND

It is frequently necessary for two spacecraft to dock while in space. Such docking typically requires the electrical connectors on one spacecraft to be mated or connected to complementary connectors on the other spacecraft. For example, when servicing a spacecraft in space, it is necessary for the servicing module to perform certain tests that require electrical data signal communication between the two spacecraft. In order to establish such electrical data signal data communication, the electrical signal connectors on the servicing module must be mated with the complementary electrical signal connectors on the spacecraft to be serviced. It is important that the signal connectors on the servicing module be accurately aligned with the signal connectors on the spacecraft to be serviced. Since time is always of the essence during space operations, it also important that the alignment and connection of the electrical connectors on both spacecraft be done as quickly as possible.

What is needed is a new apparatus for quickly and accurately aligning and connecting signal connectors on two independent spacecraft while in space.

SUMMARY OF THE INVENTION

The apparatus of the present invention simplifies and insures the alignment and connection of various mating connectors of two independent spacecraft while in space. The apparatus has a relatively low part count making the device inexpensive to manufacture, maintain and operate.

Features of the apparatus of the present invention are the use of a primary drive system to actuate single point attachment to another spacecraft and a secondary drive system to connect complementary signal connectors. In an exemplary embodiment, the apparatus uses ATDS 2.0 primary and secondary drive systems.

Another feature of the apparatus of the present invention is the use of rotating forces from a robot end-effector in order to align and connect mating connectors of two independent spacecraft.

An advantage of the apparatus of the present invention is that it can be used in various applications pertaining to the assembly and mating of components having electrical connectors.

In one aspect, the present invention is directed to an apparatus for aligning and connecting complementary signal connectors on two different bodies (e.g. two different spacecraft). In an exemplary embodiment, the apparatus comprises a housing that includes a housing support structure, a front side and a rear side. In the case of space applications, the front side may be referred to as the "outboard side" and the rear side as the "inboard side". The apparatus includes an interface that is attached to the rear side of the housing and is configured for interfacing with a device that provides rotational forces in clockwise and counter-clockwise directions, such as a robotic end-effector. The apparatus includes a first drive system having a drive end operably supported by the interface. The first drive system includes a body engagement portion that is operably supported by the housing support structure and configured to physically connect to another body. When a first rotational force is imparted to the drive end, the body engagement portion emerges from the housing so as to physically connect to another body. When an opposite second rotational force is imparted to the drive end, the body engagement portion disengages from the other body and withdraws into the housing. The apparatus includes a signal connector panel that includes at least one signal connector and is movably attached to the housing support structure such that the signal connector panel is movable in an outward direction with respect to the front side of the housing so that the signal connector mates with a complementary signal connector on another body. The signal connector panel is also movable in an opposite inward direction so as to disconnect the signal connector from the complementary signal connector. A spring operated device is attached to the signal connector panel and is operably supported by the housing support structure to constantly urge the signal connector panel in the opposite inward direction. A mechanism is movably attached to the housing support structure and is in constant physical contact with the signal connector panel. The mechanism is movable in a first direction in order to displace the signal connector panel in the outward direction and is also movable in an opposite second direction to cause retraction of the signal connector panel in the inward direction so as to disconnect the signal connector from the complementary signal connector on the other body. A second drive system is operably attached to the mechanism and operably supported by the interface. The second drive system moves the mechanism in the first direction when a third rotational force is imparted to the second drive system and in the opposite second direction when an opposite fourth rotational force is imparted to the second drive system.

In one aspect, the present invention is directed to an apparatus for aligning and connecting complementary signal connectors on two different bodies (e.g. two different spacecraft). In an exemplary embodiment, the apparatus comprises a housing that includes a housing support structure, a front side and a rear side. The apparatus includes an interface that is attached to the rear side of the housing and is configured for interfacing with a device that provides rotational forces in clockwise and counter-clockwise directions, such as a robotic end-effector. The apparatus includes a first drive system having a drive end operably supported by the interface. The first drive system includes a body engagement portion that is operably supported by the housing support structure and configured to physically connect to another body. When a first rotational force is imparted to the drive end, the body engagement portion emerges from the housing so as to physically connect to another body. When an opposite second rotational force is imparted to the drive end, the body engagement portion disengages from the other body and withdraws into the housing. The apparatus includes a signal connector panel that includes at least one signal connector and is movably attached to the housing support structure such that the signal connector panel is movable in an outward direction with respect to the front side of the housing so that the signal connector mates with a complementary signal connector on another body. The signal connector panel is also movable in an opposite inward direction so as to disconnect the signal connector from the complementary signal connector. A spring operated device is attached to the signal connector panel and is operably supported by the housing support structure to constantly urge the signal connector panel in the opposite inward direction. A mechanism is movably attached to the housing support structure and is in constant physical contact with the signal connector panel. The mechanism is movable in a first direction in order to displace the signal connector panel in the outward direction and is also movable in an opposite second direction to cause retraction of the signal connector panel in the inward direction so as to disconnect the signal connector from the complementary signal connector on the other body. A second drive system is operably attached to the mechanism and operably supported by the interface. The second drive system moves the mechanism in the first direction when a third rotational force is imparted to the second drive system and in the opposite second direction when an opposite fourth rotational force is imparted to the second drive system.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular embodiments disclosed in this summary section.

DESCRIPTION OF EXEMPLARY EMBODIMENTS

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

It is to be understood that throughout this description, terms such as "vertical", "horizontal", "top", "bottom", "upper", "lower", "middle", "above", "below" and the like are used for convenience in identifying relative locations of various components and surfaces relative to one another in reference to the drawings and that the apparatus be installed and used in substantially any orientation so that these terms are not intended to be limiting in any way.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

As used herein, the term "body" shall include any spacecraft, vehicle, machine, movable or immovable structure and waterborne surface vessel.

As used herein, the term "spacecraft" refers to any type of spacecraft used in space or space applications and includes satellites, CubeSats, space stations, capsules, modules, rockets, probes, pods, planetary rovers and other space exploration vehicles.

Figure 1:
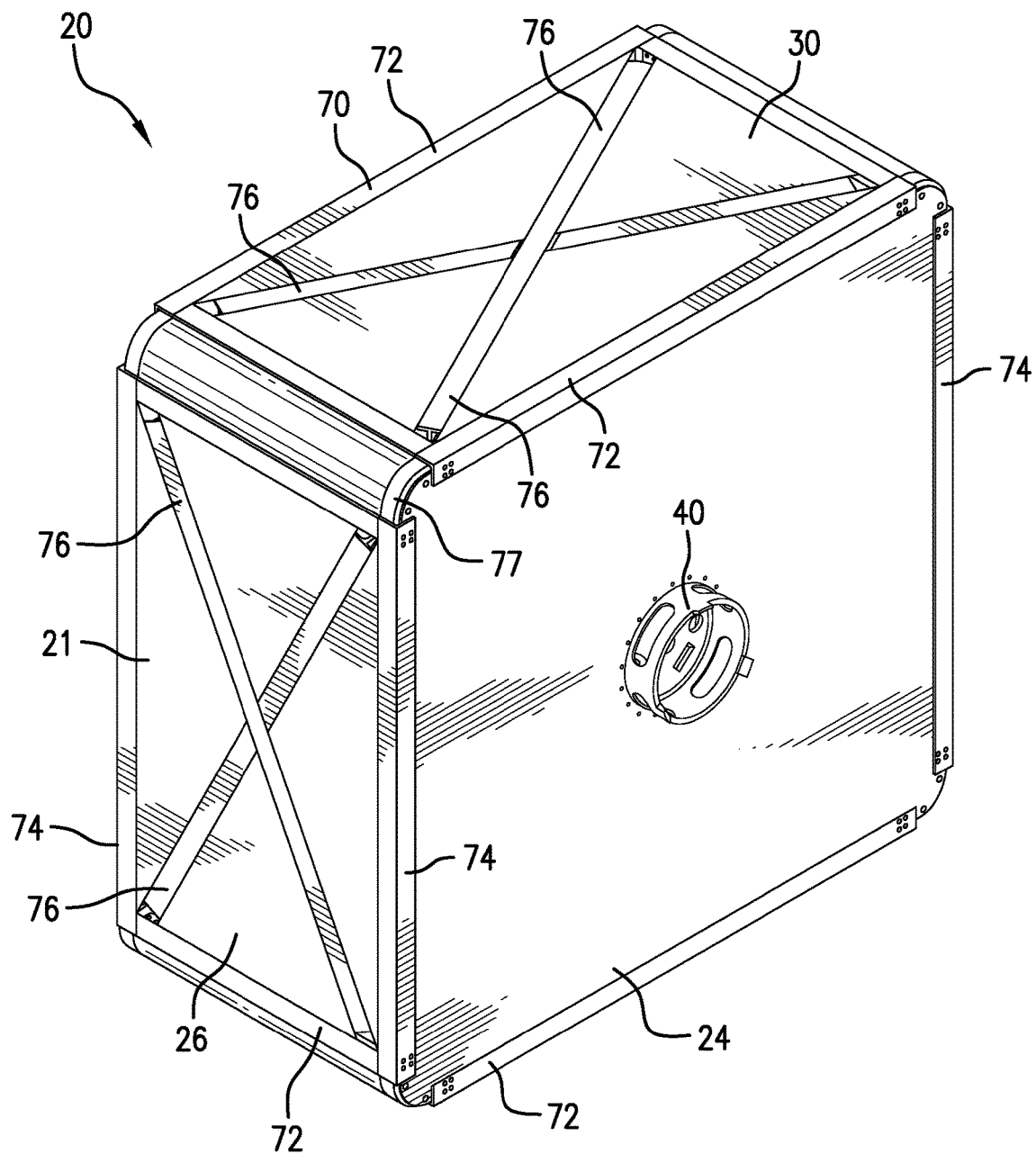
FIG. 1 is a front, perspective view of an apparatus for aligning and connecting mating signal connectors in accordance with an exemplary embodiment of the invention.
Figure 2:
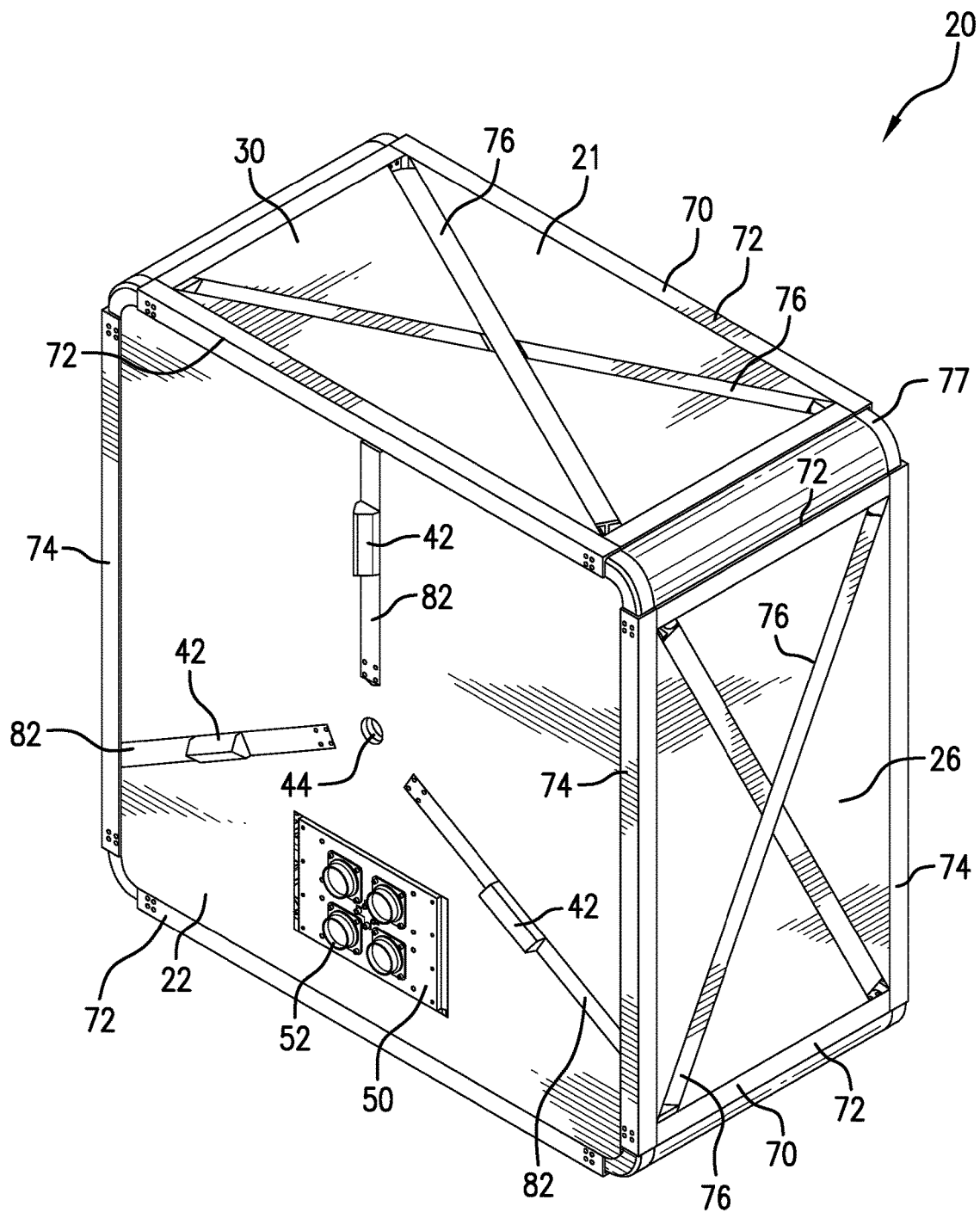
FIG. 2 is a rear, perspective view of the apparatus.
Figure 3:
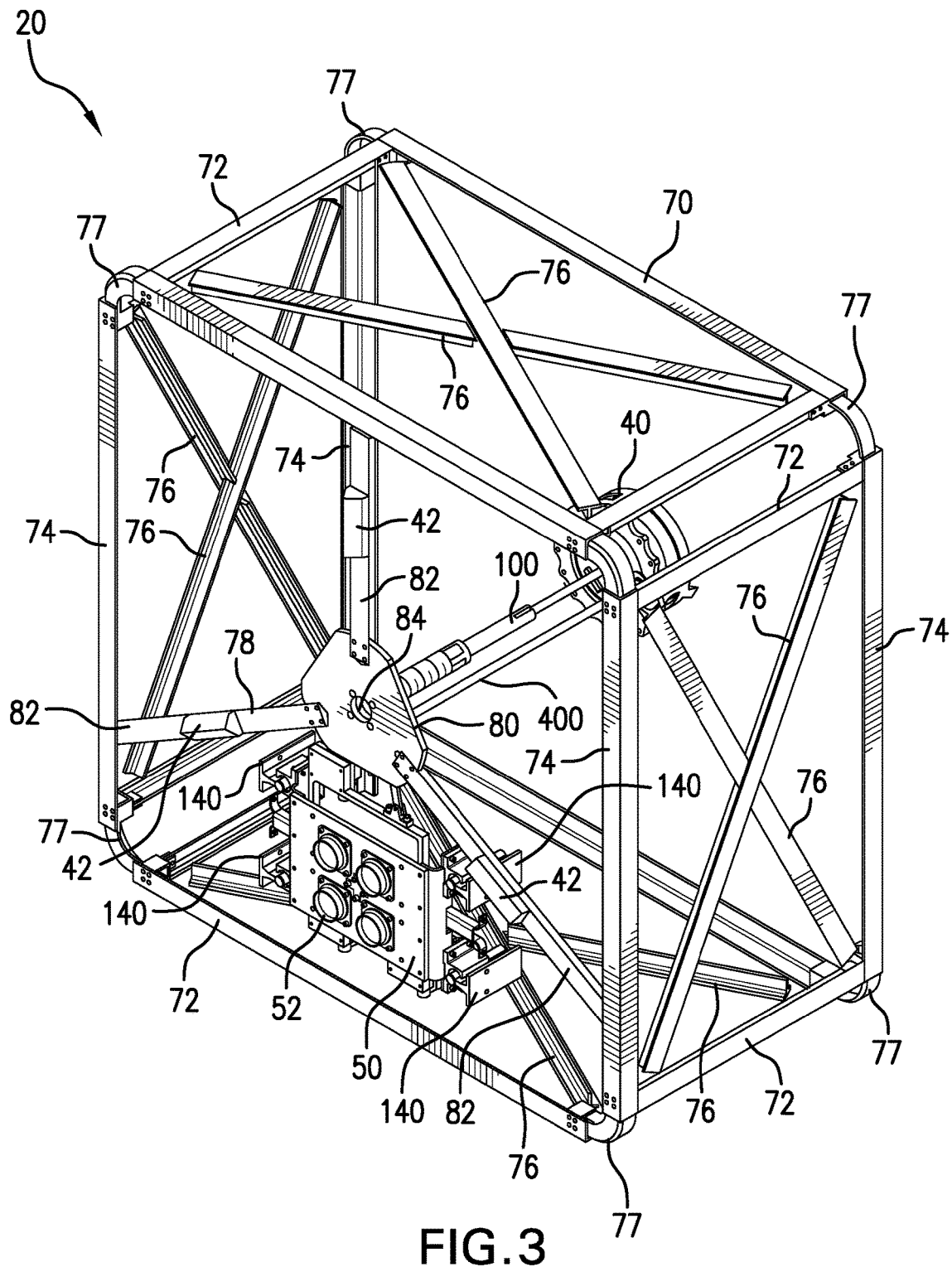
FIG. 3 is a perspective view of an housing support structure of the apparatus.
Figure 15:
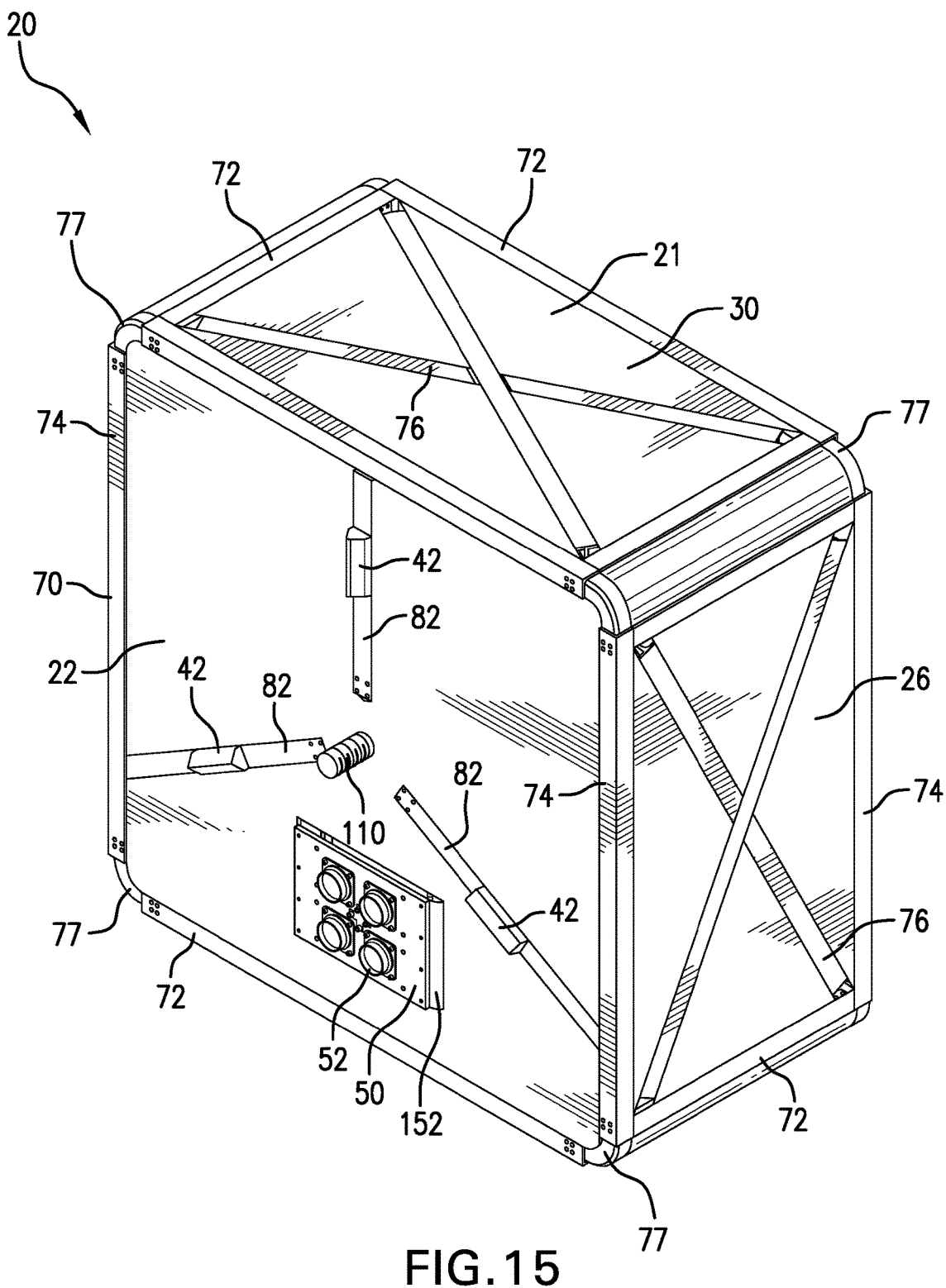
FIG. 15 is a rear perspective view of the apparatus showing the first drive device configured so the body engagement portion is emerged from the housing and the signal connector panel displaced outward.

Referring to FIGS. 1-3, there is shown apparatus 20 in accordance with an exemplary embodiment of the present invention. Apparatus 20 includes housing 21. Housing 21 includes front panel 22, rear panel 24, side panels 26 and 28, top panel 30 and a bottom panel (not shown). In the case of space applications, front panel 22 may be referred to as the "outboard panel" or the "outboard side", and rear panel 24 may be referred to as the "inboard panel" or "inboard side". Apparatus 20 includes interface 40 that is attached or joined to rear panel 24. Interface 40 is configured to interface with a device (not shown) that provides rotational forces in clockwise and counter-clockwise directions. An example of such a device is a robotic end-effector (not shown). Interface 40 may be configured to work with any one of a variety of robotic end-effectors. Apparatus 20 includes kinematic mounts 42 that are attached or joined to structural support members 82 that are part of a housing support structure 70 (see FIG. 3). Front panel 22 includes slots that are sized and shaped to expose structural support members 82. As shown in FIGS. 2, 3 and 15, kinematic mounts 42 protrude beyond the exterior surface of front panel 22. Kinematic mounts 42 are configured to physically contact corresponding mating surfaces located on a separate, independent body (e.g. spacecraft). In an exemplary embodiment, each kinematic mount 42 has a triangular cross-section having an apex and a base portion wherein the base portion is attached to the structural support members 82. In an exemplary embodiment, there are three kinematic mounts 42 that are equidistantly spaced. In an exemplary embodiment, each kinematic mount 42 is fabricated from metal. In one embodiment, kinematic mounts 42 are coated with lubricants. Kinematic mounts 42 position apparatus 20 for all forward operations such as engaging devices such as an S/C Bus. The equidistant radial spacing of kinematic mounts allows for even pre-load and thermal growth. As will be apparent from the ensuing description, kinematic mounts 42 are pre-loaded into complementary surfaces on the other body.

As shown in FIG. 2, front panel 22 has opening or through-hole 44. In an exemplary embodiment, opening 44 is centrally located on front panel 22. Opening 44 is sized to allow the passage therethrough of threaded portion 110 of first drive system 100 (see FIG. 15). These features are described in detail in the ensuing description. Apparatus 20 further includes signal connector panel 50. Signal connector panel 50 includes signal connectors 52. In an exemplary embodiment, each signal connector 52 has the same configuration, shape and design. In other embodiments, each signal connector 52 has a unique or different configuration, shape or design. As will be explained in the ensuing description, signal connector panel 50 is movable with respect to front panel 22 and can be displaced outward so that signal connector panel 50 extends beyond the exterior surface of front panel 22 and signal connectors 52 are in position to mate with complementary signal connectors on another body, such as a separate, independent spacecraft (not shown). When signal connector panel 50 is not displaced outward, signal connectors 52 are not in position to engage the complementary signal connectors on the other body. These features are further described in detail in the ensuing description.

Apparatus 20 includes housing support structure 70 which comprises a plurality of horizontal members 72, vertical members 74 and crisscross members 76. Horizontal members 72 are attached to vertical members 74 with corner members 77. Front panel 22, rear panel 24, side panels 26 and 28, and top panel 30 and the bottom panel are attached or joined to housing support structure 70. In one embodiment, front panel 22, rear panel 24, side panels 26 and 28 and top panel 30 are configured to have slots therein so that portions of housing support structure 70 are exposed. In an exemplary embodiment, front panel 22, rear panel 24, side panels 26 and 28, and top panel 30 and the bottom panel are removably attached to housing support structure 70. Housing support structure 70 further includes front structure 78 that is located at the front of housing support structure 70. Front structure 78 includes center plate 80 and structural support members 82 that are attached to center plate 80 and other portions of housing support structure 70. Center plate 80 includes central opening 84 through which threaded portion 110 of primary drive device 100 protrudes. Central opening 84 is aligned with opening 44 in front panel 22. As shown in FIGS. 2 and 3, kinematic mounts 42 are attached to support members 82 and protrude from the slots in front panel 22.

Figure 4:
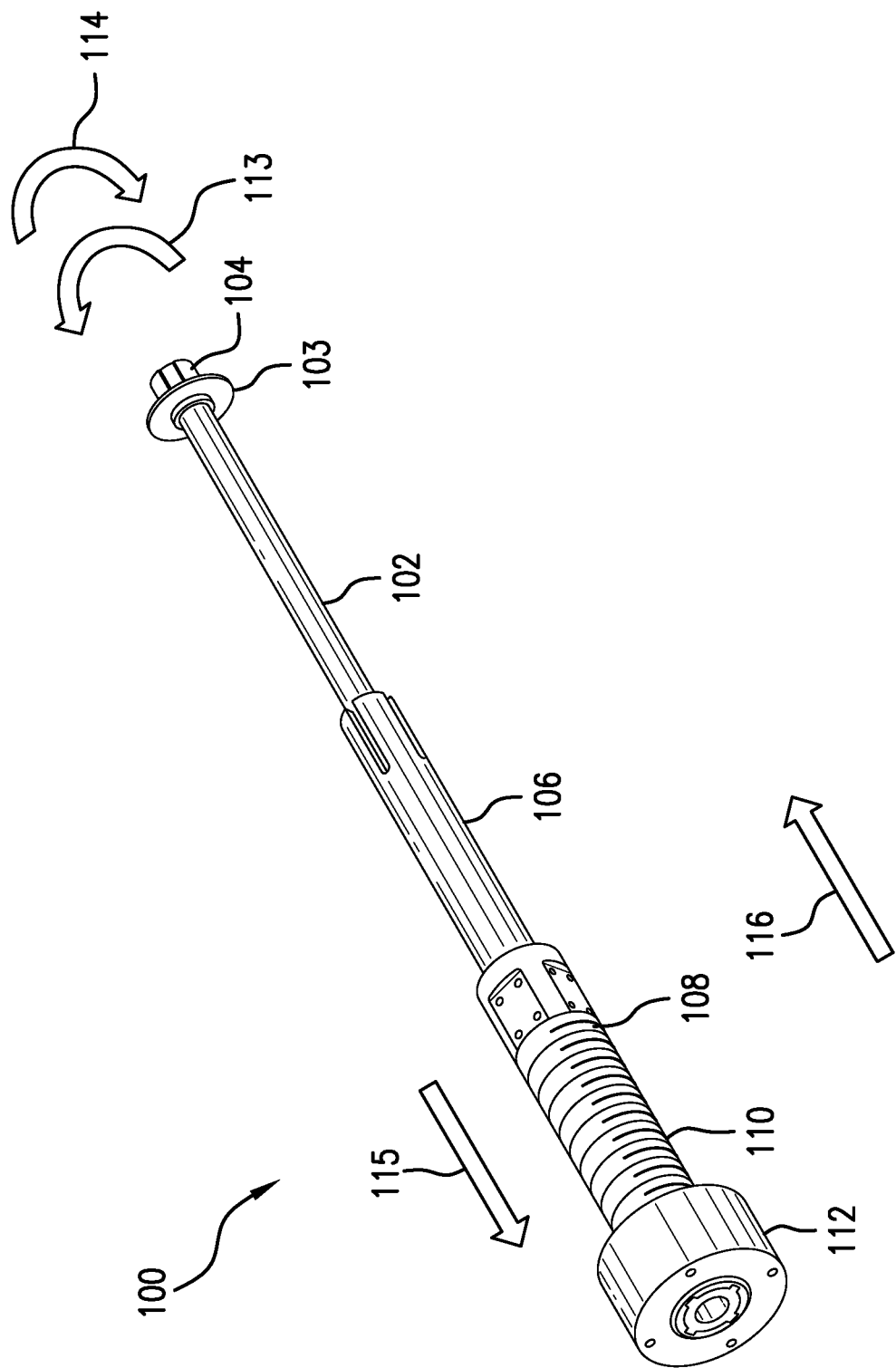
FIG. 4 is a perspective view of a first drive system shown in FIG. 1, a body engagement portion being withdrawn.
Figure 5:
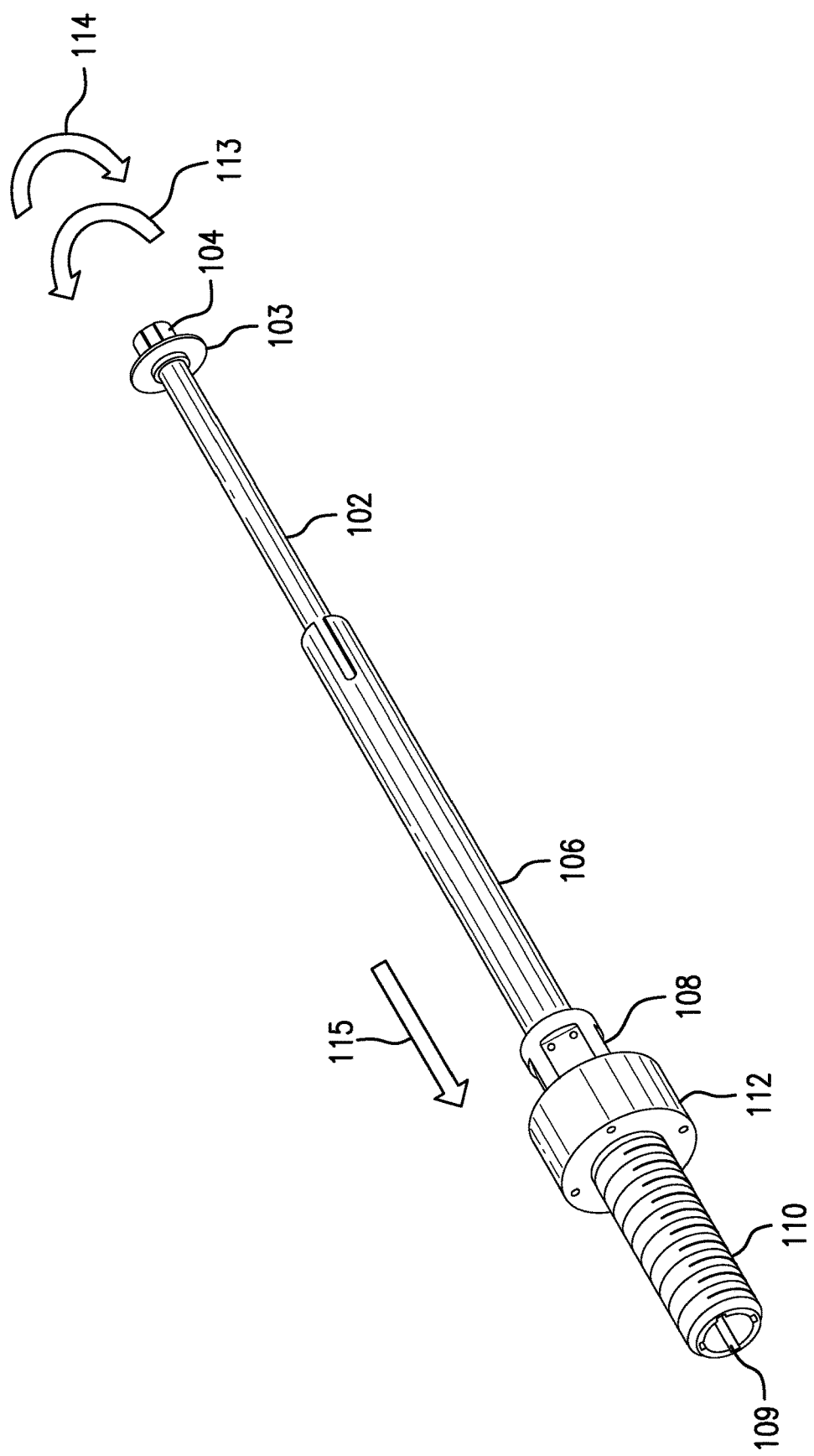
FIG. 5 is a perspective view of the first drive system wherein the body engagement portion is emerged so as to physically connect to another body.
Figure 6:
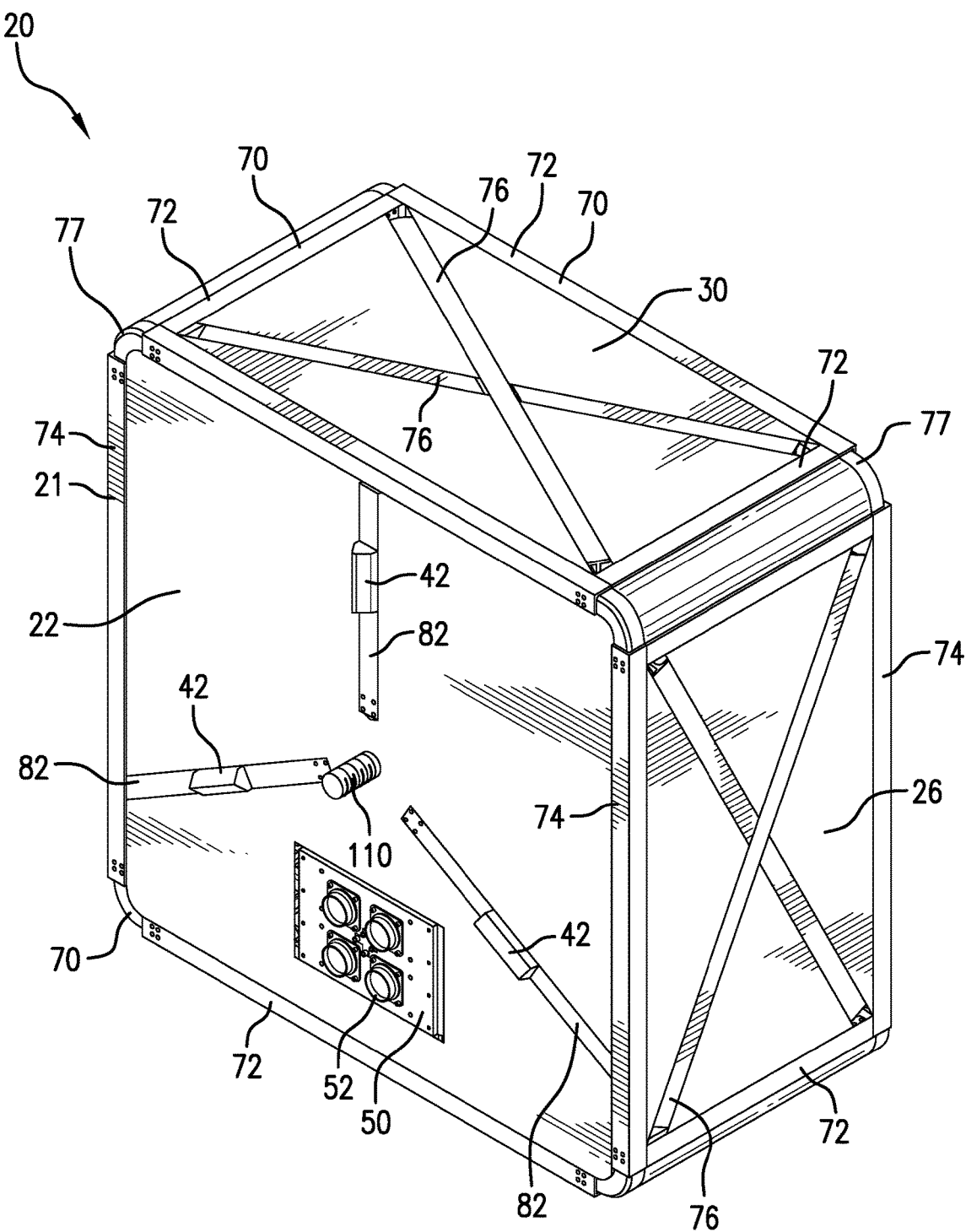
FIG. 6 is a perspective view of the apparatus wherein the first drive system is configured so that the body engagement portion is emerged from the housing.

Referring to FIGS. 4 and 5, first drive system 100 comprises elongate member 102. Elongate member 102 includes flange 103 and drive end portion 104. Flange 103 and drive end portion 104 are positioned within interface 40. Flange 103 prevents elongate member 102 from being dislodged from interface 40. Drive end portion 104 is configured to be engageable with a device that produces rotational forces in clockwise and counter-clockwise directions. One example of such a device is a robotic end-effector. Elongate member 102 has a portion thereof fitted into and attached to intermediate elongate member 106. When a rotational force is applied to drive end portion 104, elongate member 102 and intermediate elongate member 106 rotate together. First drive member 100 includes body engagement section 108 which is configured to engage or physically connect to another body. This feature is discussed in detail in the ensuing description. Intermediate elongate member 106 is telescopically disposed within body engagement section 108 such that body engagement section 108 can slide upon intermediate section 106. Intermediate elongate member 106 includes a key structure (not shown) on the exterior surface thereof. The key structure is sized and configured to fit within keyway 109 located in the inner diameter of body engagement section 108. Such a configuration allows body engagement section 108 to rotate with intermediate elongate member 106. Thus, elongate member 102, intermediate elongate member 106 and body engagement section 108 all rotate together when a rotational force is applied to drive end portion 104. Body engagement section 108 includes threaded portion 110 that engages an inner threaded surface (not shown) of collar 112. Collar 112 is attached to center plate 80 so that the opening in collar 112 is aligned with central opening 84 in center plate 80. When a rotational force is applied to drive end portion 104, threaded portion 110 rotates within collar 112. If a clockwise rotational force 113 (as viewed from the rear of apparatus 20) is applied to drive end portion 104 by a robotic end-effector, the threaded engagement between threaded portion 110 and the inner threaded surface of collar 112 causes body engagement section 108 to move linearly upon intermediate elongate member 106 in direction 115 as elongate member 102, intermediate elongate member 106 and body engagement section 108 all rotate in the clockwise direction. Threaded portion 110 eventually emerges from central openings 44 and 84 as shown in FIG. 6. Threaded portion 110 is configured to engage a complementary threaded surface or threaded structure on another body. In order to effect movement of body engagement section 108 in opposite direction 116, a robotic end-effector or similar device applies a counter-clockwise rotational force 114 to drive end portion 104. This movement causes threaded portion 110 to be withdrawn into central opening 44 in front panel 22.

Referring to FIGS. 3, 7, 8 and 10-12, signal connector panel 50 includes front side 120 and rear side 122. Each electrical signal connector 52 is configured to mate or engage a complementary signal connector on another body. In an exemplary embodiment, each electrical connector 52 is removably attached to signal connector panel 50 via screws 123. Signal connector panel 50 and is movably attached to housing support structure 70 such that signal connector panel 50 is movable in an outward direction 126 with respect to front side 22 of housing 21 so that signal connector 52 can engage or mate with a complementary signal connectors on another body (see FIG. 12). For example, the complementary signal connectors can be signal connectors in an S/C Bus. Signal connector panel 50 is also movable in an opposite inward direction 128 so that signal connector 52 becomes disengaged from the complementary signal connector on the other body.

Figure 7:
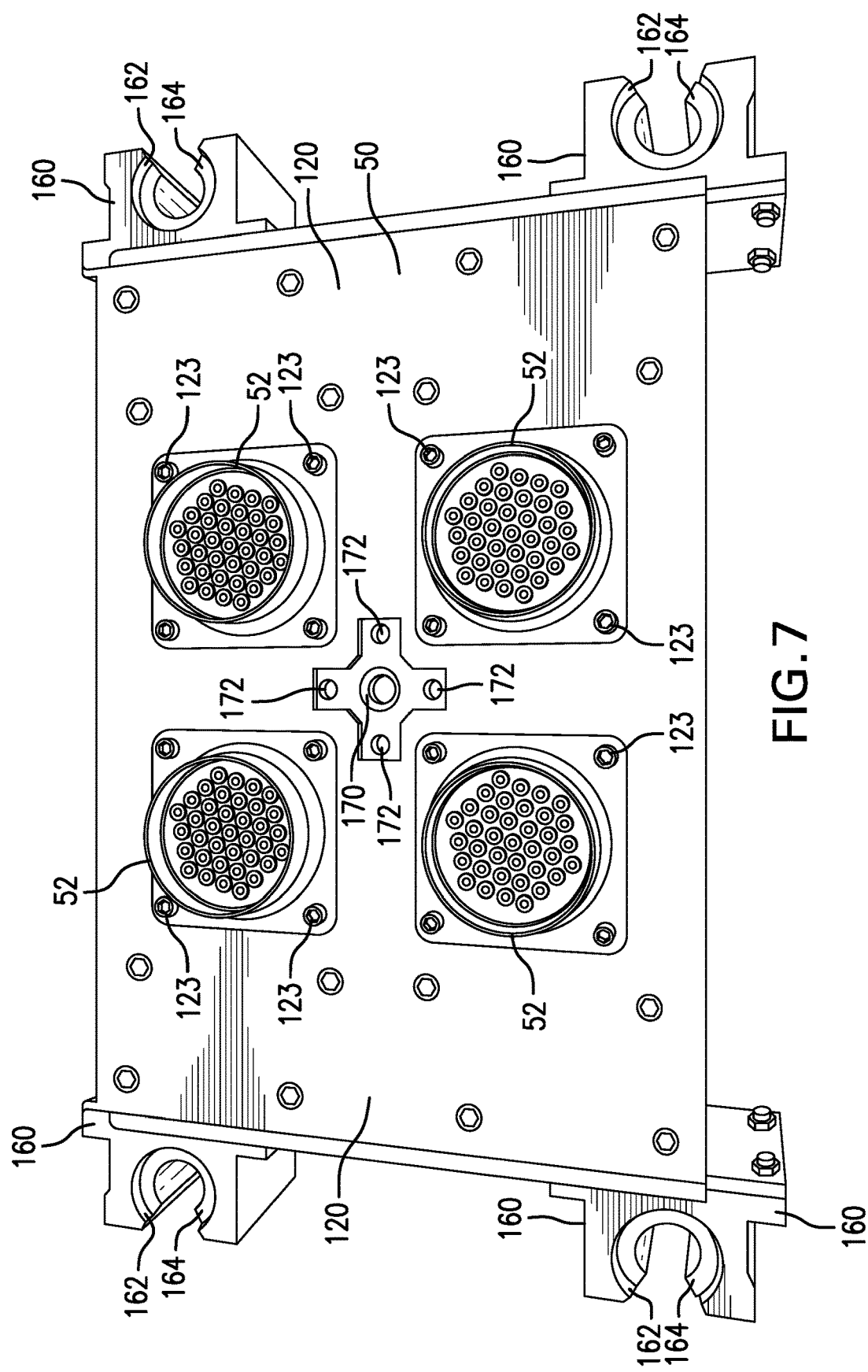
FIG. 7 is a perspective view of a first side of a signal connector panel shown in FIG. 3.
Figure 8:
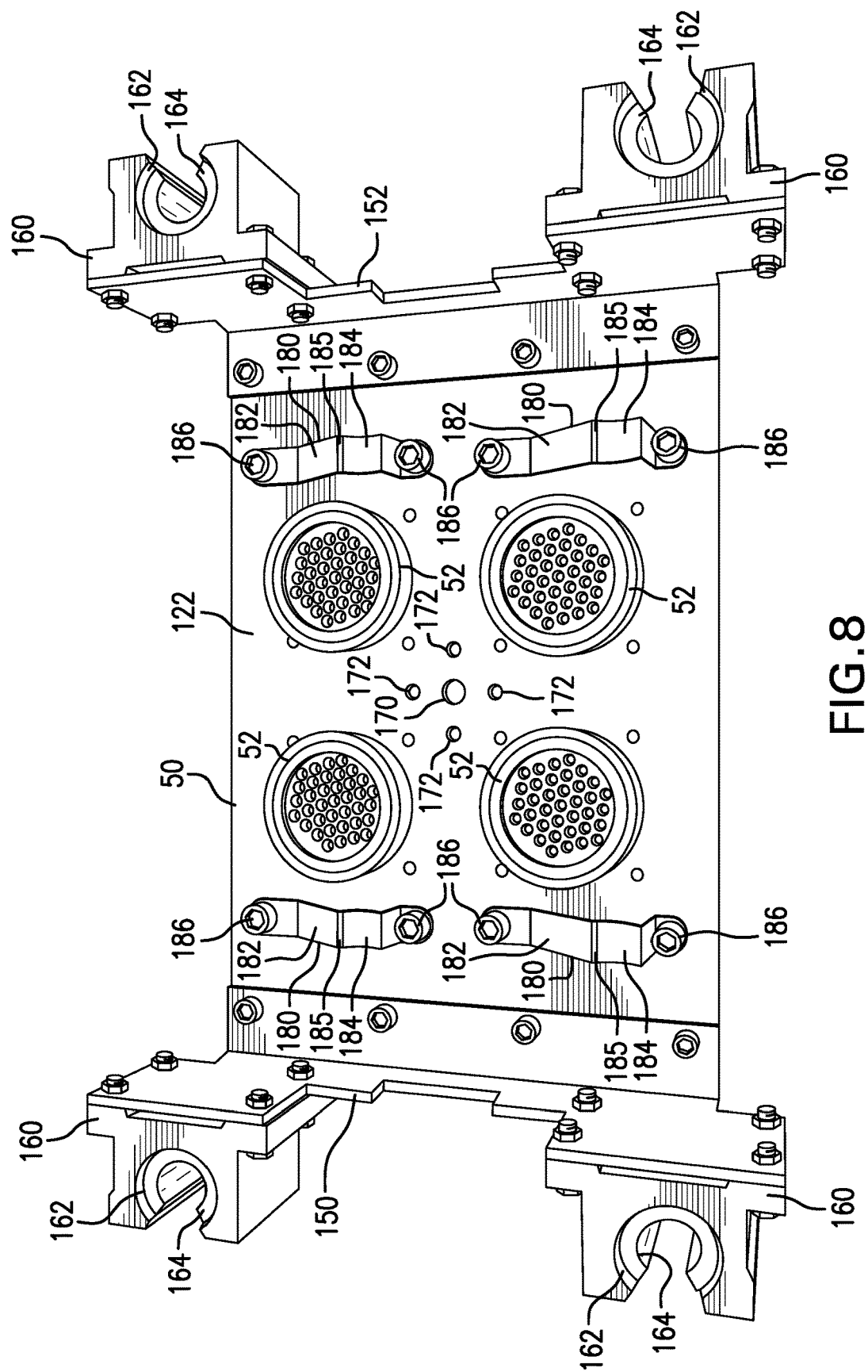
FIG. 8 is a perspective view of a second side of the signal connector panel.

Referring to FIGS. 3, 7, 8 and 10-13, apparatus 20 further includes a first plurality of support rail shafts 140 that are attached to various portions of housing support structure 70. For purposes of simplicity and to facilitate understanding of this aspect of the invention, housing support structure 70 is not shown in FIGS. 10-13. Each support rail shaft 140 includes base portion 142, neck portion 144 and rail shaft portion 146. The support rail shafts 140 are arranged so that each rail shaft portion 146 is parallel to the other rail shaft portions 146. Signal connector panel 50 includes a pair of sidewall structures 150 and 152 that are attached to rear side. In an exemplary embodiment, sidewall structures 150 and 152 are removably attached to rear side 122. Signal connector panel 50 further includes a plurality of linear sleeve bearing structures 160. Each linear sleeve bearing structure 160 includes channel 162 and linear sleeve bearing 164 located within channel 162. As shown in FIGS. 7 and 8, two linear sleeve bearing structures 160 are attached to each sidewall structure 150 and 152. Each linear sleeve bearing 164 is sized and configured to receive a corresponding rail shaft portion 146. This configuration allows signal connector panel 50 to slide on rail shaft portions 146 either in an outward direction 126 or an inward direction 128.

Signal connector panel 50 has central opening 170 and additional openings 172 that are positioned about central opening 170. The purpose and function of openings 170 and 172 are described in the ensuing description. Signal connector panel 50 includes ramp structures 180 that are attached to rear side 122. Each ramp structure 180 defines ramped surface 182 and detent 184 that is contiguous with ramped surface 182. Ramped surface 182 has a peak 185 just before detent 184. In an exemplary embodiment, ramp structures 180 are attached to signal connector panel 50 with screws or bolts 186. In another embodiment, ramp structures 180 are integral with signal connector panel 50. The purpose of ramp structures 180 is described in the ensuing description.

Figure 10:
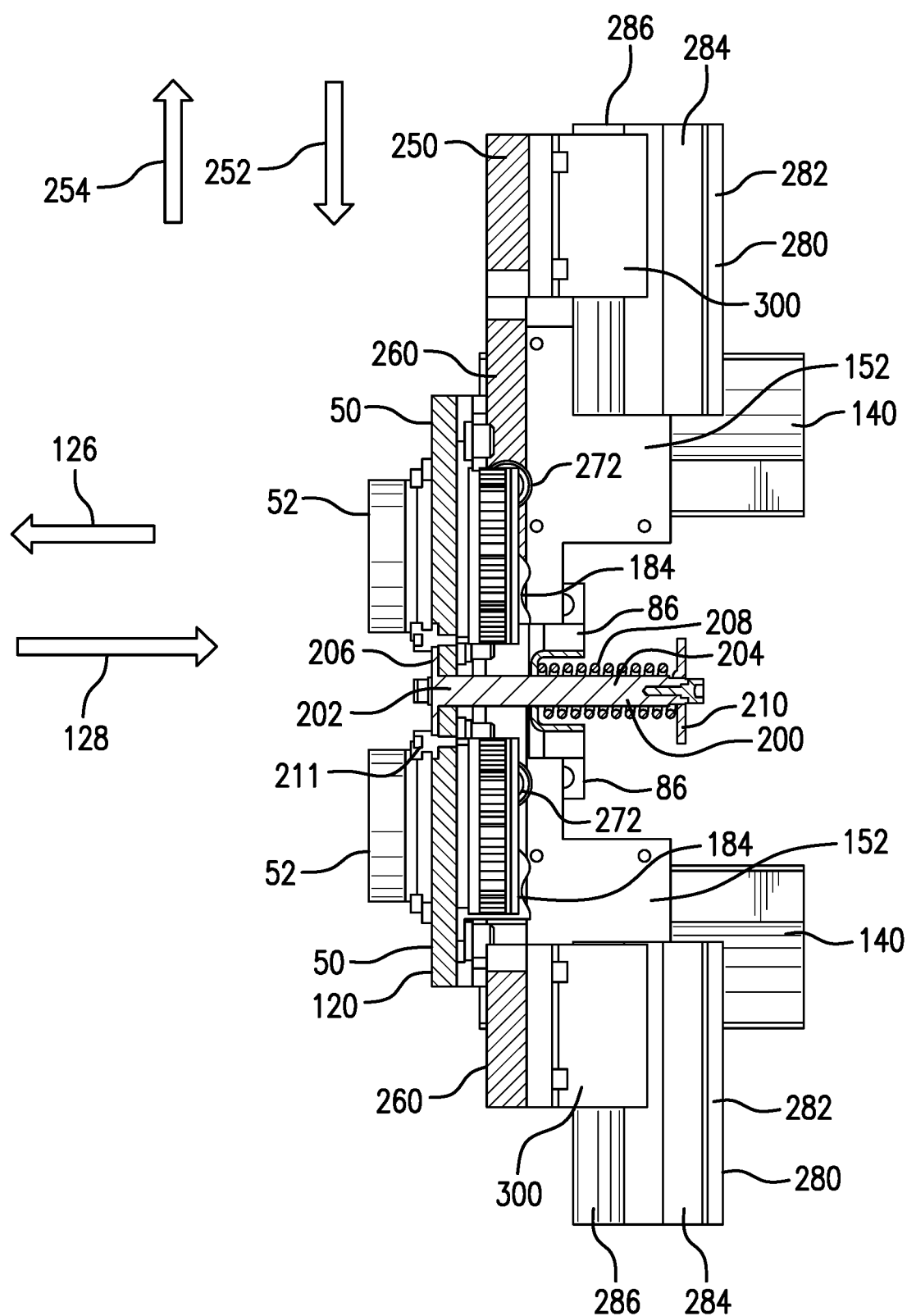
FIG. 10 is a side elevational view, partially in cross-section, showing the interrelationship of the signal connector panel and the guide rail assembly, the other portions of the apparatus not being shown in order to facilitate viewing of the signal connector panel and the guide rail assembly.
Figure 11:
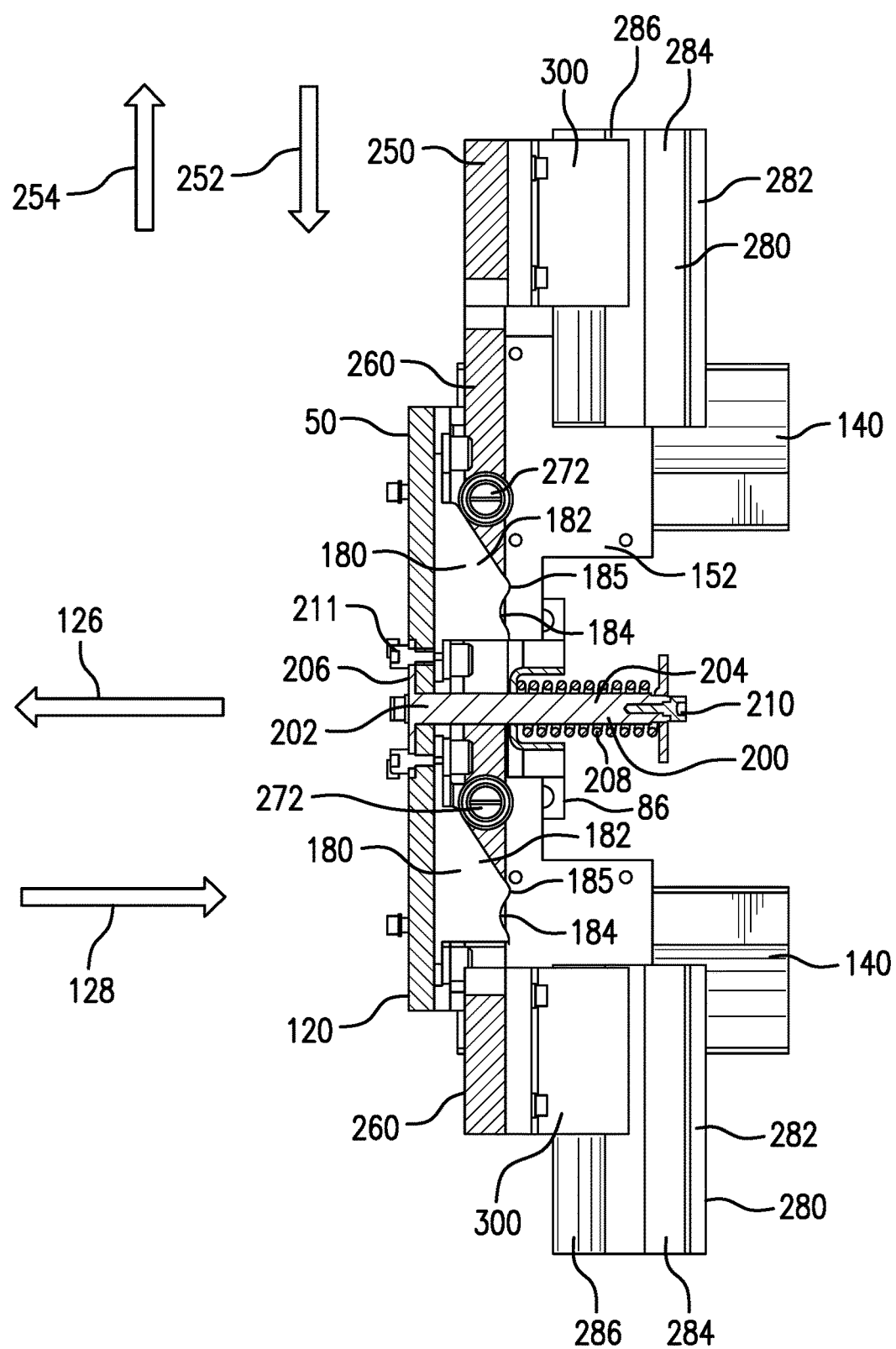
FIG. 11 is a side elevational view, partially in cross-section, showing the guide-rail assembly in a first position prior to being displaced to a second position and the signal connector panel in a retracted position, the signal connectors and remaining portions of the apparatus not being shown in order to facilitate viewing of the ramped structures on the second side of the signal connector panel and the rollers of the guide-rail assembly.
Figure 12:
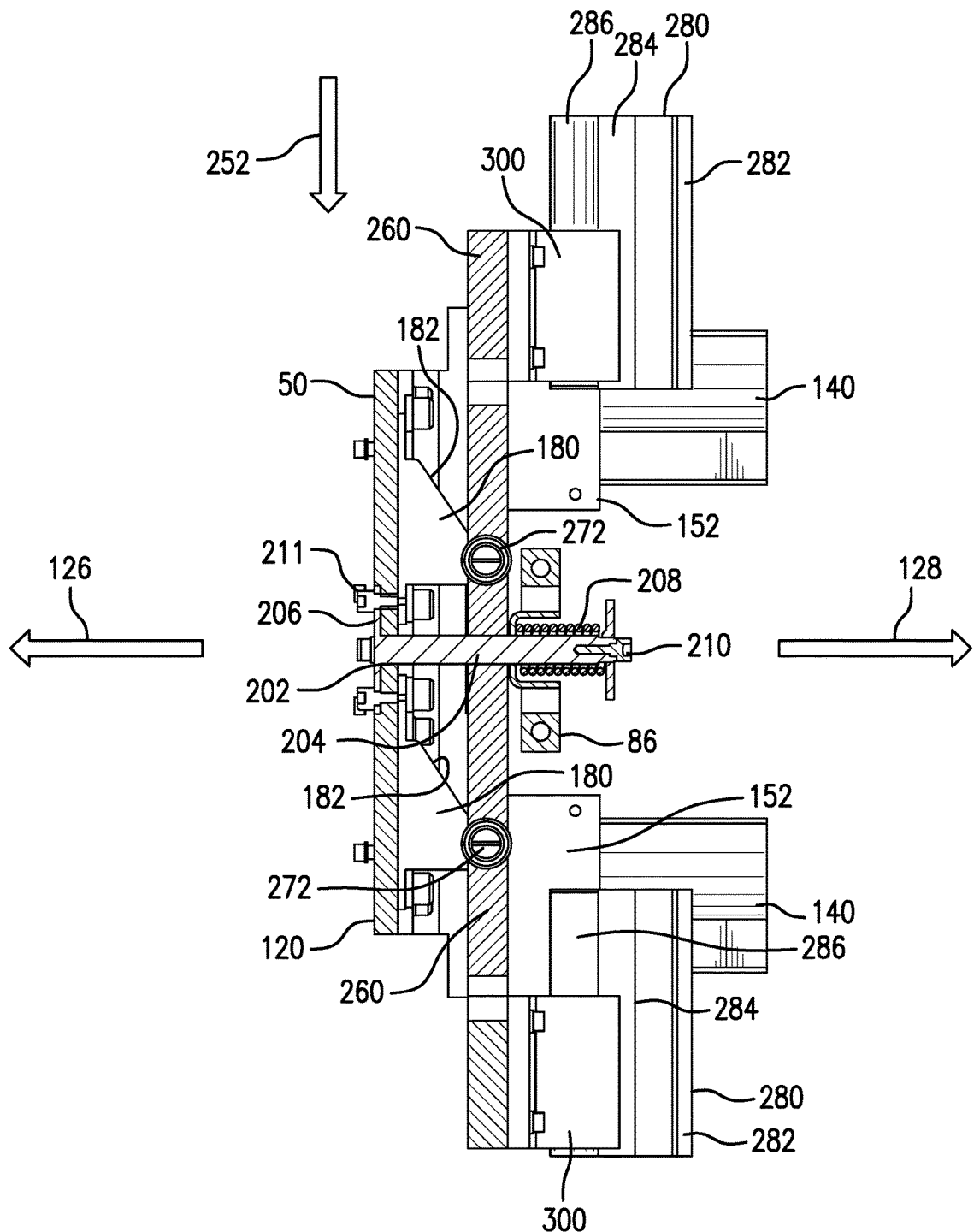
FIG. 12 is a side elevational view, partially in cross-section, showing the guide-rail assembly displaced to the second position so as to displace the signal connector panel outward in order to mate the signal connectors to complementary signal connectors on the other body, the signal connectors and other portions of the apparatus not being shown in order to facilitate viewing of the ramped structured on the second side of the signal connector panel and the rollers of the guide-rail assembly.

Referring to FIGS. 10-12, apparatus 20 further includes spring operated device 200 that is attached to signal connector panel 50 and is operably supported by support member 86. Support member 86 is part of housing support structure 70. Spring operated device 200 constantly urges signal connector panel 50 in inward direction 128. Spring operated device 200 comprises a generally "T" shaped member 202 having stem section 204, transverse section 206 which is substantially perpendicular to stem section 204, spring 208 and cap member 210. In an exemplary embodiment, cap member 210 is removably attached to stem section 204. Stem section 204 is inserted through central opening 170 in signal connector panel 50 and transverse section 206 is attached to signal connector panel 50 via screws 211 that are inserted into holes (not shown) in transverse section 206 and threadedly engaged with threaded openings 172. In an alternate embodiment, "T" shaped member 202 is rigidly attached to signal connector panel 50. In an exemplary embodiment, cap member 210 is removably attached to stem section 204. Spring 208 is positioned on stem section 204 and interposed between support structure 86 and cap member 210 so as to constantly urge signal connector panel 50 in inward direction 128.

Referring to FIGS. 9-12, apparatus 20 further includes guide-rail assembly 250 that is movably attached to housing support structure 70 and is in constant physical contact with signal connector panel 50. Guide-rail assembly 250 is movable in first direction 252 to displace signal connector panel 50 in the outward direction 126 and in an opposite second direction 254 to cause retraction of signal connector panel 50 in inward direction 128 so as to disengage or disconnect signal connector 52 from a complementary signal connector on another body. In this configuration, the movement of guide-rail assembly 250 in first direction 252 and second direction 254 is linear. Guide-rail assembly 250 further includes frame member 260 and arm member 262. Arm member 262 has a first end portion pivotally attached to frame member 260 and a second distal end portion. Frame member 260 includes top frame section 264, bottom frame section 266, side frame section 268 and side frame section 270. In an exemplary embodiment, arm 262 is pivotably attached to bracket 263 which is attached to top frame section 264 via screws 265. Guide-rail assembly 250 includes a plurality of rollers 272 and roller supports 273. Roller supports 273 are attached to frame member 260 and each roller 272 is rotatably attached to a corresponding roller support 273. Each roller 272 traverses a corresponding ramped surface 182 of one of ramped structures 180 when frame member 260 is moving in either direction 252 or direction 254. Due to the structure of each ramped surface 182 and the location of peak 185, signal connector panel 50 is pushed outward in direction 126 as frame member 260 moves downward in direction 252. When frame member 260 moves the maximum distance in first direction 252, each roller 272 slips into a corresponding detent 184. When rollers 272 are positioned in the corresponding detents 184, signal connector panel 50 is held firmly in its most outward position to allow signal connector 52 to mate with a complementary signal connector on another body. As will be explained in the ensuing description, in order to retract signal connector panel 50, a force pulls frame member 260 upward in direction 254. Rollers 272 traverse ramped surfaces 182 in an upward direction as frame member 260 moves upward in direction 254. As frame member 260 moves upward in direction 254, signal connector panel 50 moves inward in direction 128 thereby disengaging or disconnecting signal connectors 52 from complementary signal connectors on the other body. In an alternate embodiment, there is one only ramped structure 180 on rear side 122 of signal connector panel 50 and one roller 272 on frame member 260.

Figure 9:
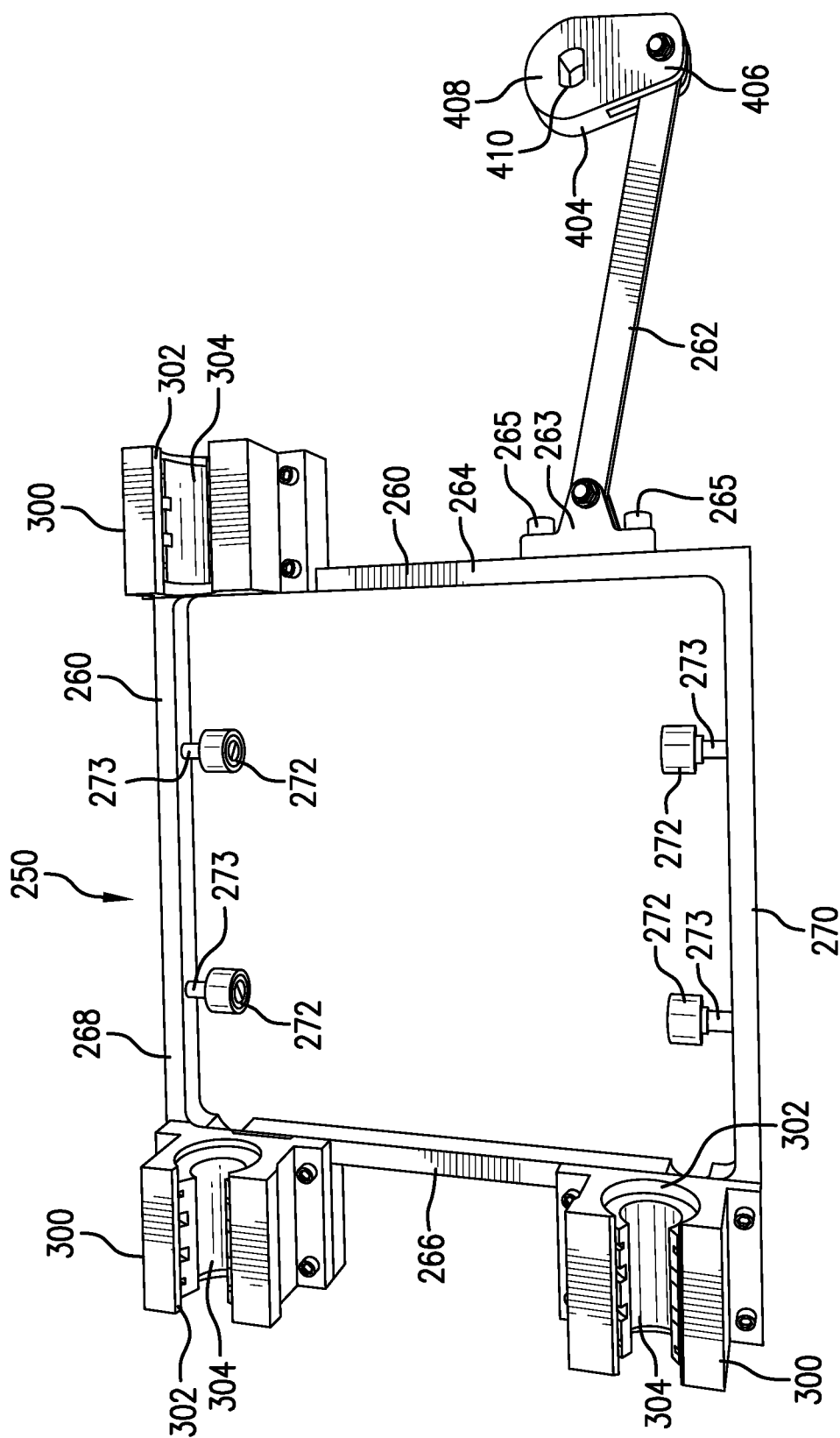
FIG. 9 is a perspective view of one side of a guide rail assembly shown in FIG. 3.

Referring to FIGS. 9-12 and 14, apparatus 20 further includes another plurality of support rail shafts 280 that are attached to housing support structure 70. Each support rail shaft 280 includes base portion 282, neck portion 284 and rail shaft portion 286. Support rail shafts 280 are arranged so that each rail shaft portion 286 is parallel to the other rail shaft portions 286. Frame member 260 further includes another plurality of linear sleeve bearing structures 300. As shown in FIG. 9, each linear sleeve bearing structure 300 includes channel 302 and linear sleeve bearing 304 that is positioned within channel 302. Any suitable technique may be used to retain linear sleeve bearing 304 within channel 302. A linear sleeve bearing structure 300 is attached to top frame section 264 and two linear sleeve bearing structures 300 are attached to bottom frame section 266. Each linear sleeve bearing 304 is sized and configured to receive a corresponding rail shaft portion 286. This configuration allows frame member 260 to slide on rail shaft portions 286 in either a downward direction 252 or upward direction 254. The movement of frame member 260 in direction 252 or direction 254 is linear.

Figure 13:
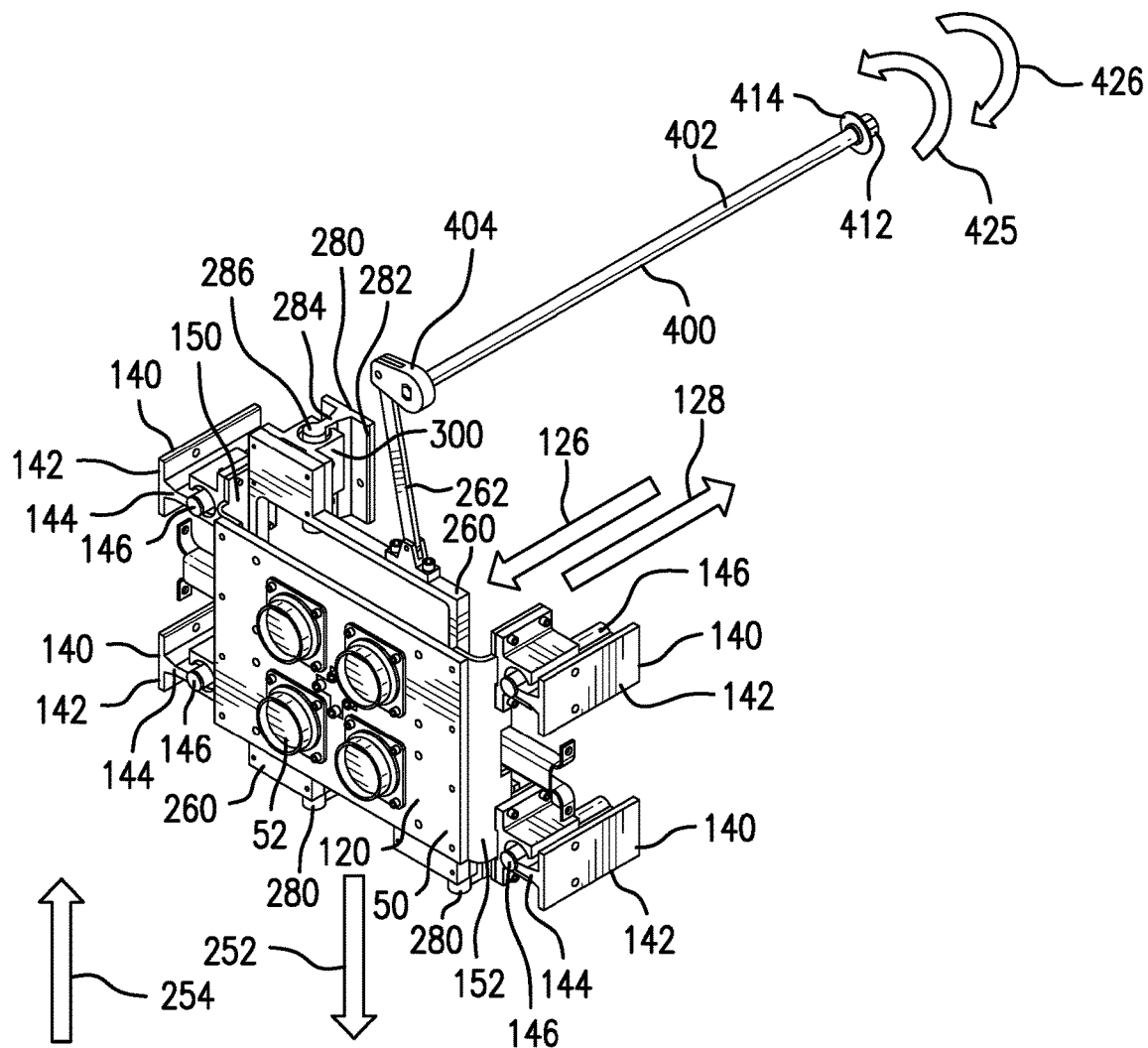
FIG. 13 is a perspective view of the guide-rail assembly and the signal connector panel, the guide-rail assembly being in a first position and the signal connector panel being in a retracted position.
Figure 14:
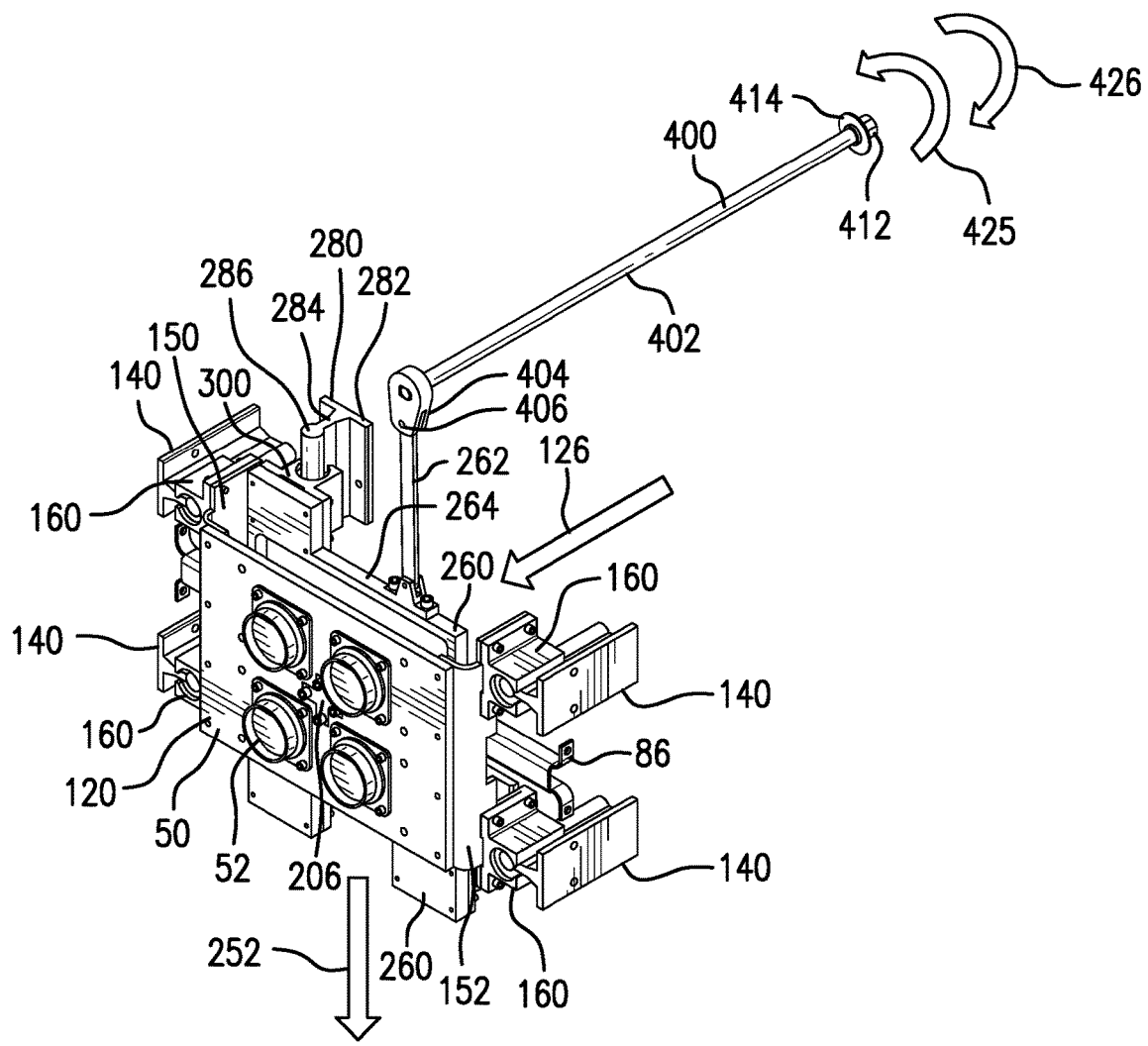
FIG. 14 is a perspective view of the guide-rail assembly and the signal connector panel, the guide-rail assembly being displaced to a second position and the signal connector panel displaced outward so as to mate the signal connectors with complementary signal connectors on the other body.

Referring to FIGS. 3, 9, 13 and 14, apparatus 20 further includes second drive system 400 that comprises elongate member 402 and mechanical link member 404. Mechanical link member 404 has a first end 406 that is attached to the distal second end of arm 262 and second end 408 that defines opening 410. Elongate member 402 has one end that is lodged within opening 410 and a drive end 412 located within interface 40 so that it is engageable with a device that produces rotational forces, e.g. robotic end-effector. Elongate member 402 includes circular flange 414 that is configured to be positioned within interface 40. Circular flange 414 prevents elongate member 402 from being dislodged from interface 40. When a device, such as a robotic end-effector, imparts or applies a first rotational force in a first direction to elongate member 402, mechanical link member 404 and arm member 262 cooperate to convert the first rotational force to a linear downward movement of guide-rail assembly 250. This is illustrated in FIGS. 13 and 14. When a clockwise rotational force 425 (as seen from the rear of apparatus) is applied to drive end 412 of elongate member 402 by a robotic end-effector (see FIG. 13), the clockwise rotational force 425 causes mechanical link member 404 to impart a downward force on arm 262. The downward force on arm 262 causes frame member 260 to move downward in direction 252 so as to cause signal connector panel 50 to move outward in direction 126 so as to mate signal connectors 52 with the signal connectors on another body (see FIG. 14). When a counter-clockwise rotational force 426 is applied to drive end 412 of elongate member 402 by a robotic end-effector, mechanical link member 404 imparts an upward, pulling force upon arm 262 that causes frame member 260 to move upward in direction 254. Movement of frame member 260 upward in direction 254 causes retraction of signal connector panel 50 in direction 128 so as to disengage or disconnect signal connectors 52 from the signal connectors on the other body.

In order to use apparatus 20, a device that is capable of producing rotational forces, such as a robotic end-effector (not shown), is engaged with interface 40 in order to apply or impart rotational forces to first drive system 100 and second drive system 400. Apparatus 20 is then maneuvered so that kinematic mounts 42 mate with complementary surfaces on another body. Once kinematic mounts 42 mate with the complementary surfaces, central opening 44 in front panel 22 will be aligned with a threaded opening in the other body and signal connectors 52 will be aligned with the complementary signal connectors (not shown) on the other body. The robotic end-effector then applies a first rotational force to primary drive system 100 so that threaded portion 110 emerges from central opening 44 and becomes threadedly engaged with the complementary threaded opening on the other body. Once threaded portion 110 is completely threadedly engaged to the complementary threaded opening in the other body, the robotic end-effector then applies a rotational force to secondary drive system 400 in order to cause guide-rail assembly 250 to move downward in direction 252 which causes signal connector panel 50 to move outward in direction 126 so as to enable signal connectors 52 to connect or mate to the complementary signal connectors on the other body. In order to disengage apparatus 20 from the other body, the robotic end-effector applies an opposite rotational force to secondary drive system 400 so that elongate member 402 rotates in the opposite direction and mechanical link member 404 pulls guide-rail assembly 250 upward in direction 254. This allows spring operated device 200 to pull or retract signal connector panel 50 in direction 128 so as to disconnect signal connectors 52 from the complementary signal connectors on the other body. Next, the robotic end-effector applies a rotational force to primary drive system 100 that causes elongate member 102 to rotate in an opposite direction in order to unthread threaded portion 110 from the complementary threaded inlet or opening in the other body. Once threaded portion 110 is completely unthreaded from the complementary threaded inlet on the other body, apparatus 20 may be maneuvered away from the other body.

Apparatus 20 may be fabricated from a variety of materials including metal, copper, brass, stainless steel, aluminum or aluminum honeycomb panels, plastic and composite materials.

The preceding description of the disclosed embodiments is provided to enable any person skilled in the art to make or use the present invention. The embodiments were chosen and described in order to best explain the principles of the invention and its practical applications. Various modifications to these embodiments will readily be apparent to those skilled in the art, and the generic principles defined herein may be applied to other embodiments without departing from the spirit or the scope of the invention. Thus, the present invention is not intended to be limited to the embodiments shown herein but is to be accorded the widest scope consistent with the following claims and the principles and novel features disclosed herein. Any reference to claim elements in the singular, for example, using the articles "a", "an" or "the" is not to be construed as limiting the element to the singular.

What is claimed is:

1. An apparatus for aligning and connecting complementary signal connectors on two different bodies, comprising:
   a housing including an housing support structure, a front side and a rear side;
   an interface attached to the housing and which is configured to interface with a device that produces rotational forces in clockwise and counter-clockwise directions;
   a first drive system having a drive end operably supported by the interface and a body engagement portion that is operably supported by the housing support structure and configured to physically connect to another body, wherein a first rotational force imparted to the drive end causes the body engagement portion to emerge from the housing so as to physically connect to another body and an opposite second rotational force imparted to the drive end causes the body engagement portion to disengage from the other body and withdraw into the housing;
   a signal connector panel including at least one signal connector and movably attached to the housing support structure such that the signal connector panel is movable in an outward direction with respect to the front side of the housing so that the signal connector mates with a complementary signal connector on another body and movable in an opposite inward direction so that the signal connector is disconnected from the complementary mating connector;
  a spring operated device attached to the signal connector panel and operably supported by the housing support structure to constantly urge the signal connector panel in the opposite inward direction;
  a mechanism movably attached to the housing support structure and in constant physical contact with the signal connector panel, the mechanism being movable in a first direction in order to displace the signal connector panel in the outward direction and movable in an opposite second direction to cause retraction of the signal connector panel in the inward direction so as to disconnect the signal connector from the complementary signal connector on the other body; and
  a second drive system operably attached to the mechanism and operably supported by the interface, the second drive system moving the mechanism in the first direction when a third rotational force is imparted to the second drive system and in the opposite second direction when an opposite fourth rotational force is imparted to the second drive system.

2. The apparatus according to claim 1 wherein the signal connector panel is available on the front side of the housing and the interface is on the rear side of the housing.

3. The apparatus according to claim 1 wherein the body engagement portion includes threads and rotates when the first rotational force is imparted to the drive end so as to allow the body engagement portion to threadedly engage a complementary threaded surface on the other body.

4. The apparatus according to claim 3 wherein the movement of the mechanism in the first direction and opposite second direction is linear movement and wherein the mechanism further comprises:
  a frame member having portions thereof in constant physical contact with the signal connector panel; and
  an arm member having one end pivotally attached to the frame and an opposite distal end.

5. The apparatus according to claim 4 further comprising a mechanical link member having a first portion pivotally attached to the opposite distal end of the arm member and a second portion operably attached to the second drive system, wherein the mechanical link member and the arm member cooperate to convert the rotational motion of the second drive system into linear movement of the mechanism.

6. The apparatus according to claim 5 wherein the signal connector panel has a front side and a rear side and wherein the mechanism is in constant physical contact with the rear side of the signal connector panel.

7. The apparatus according to claim 6 wherein the rear side of the signal connector panel has at least one ramp structure thereon which defines a ramped surface and a detent that is contiguous with the ramped surface and wherein the frame member includes at least one roller member that traverses the ramped surface when the frame member is moving in the first direction and in the second direction, the roller member moving into the detent when the frame member moves a predetermined distance in the first direction, wherein the signal connector panel is displaced outward a maximum distance when the roller member is within the detent.

8. The apparatus according to claim 7 wherein the at least one ramp structure is integral with the signal connector panel.

9. The apparatus according to claim 7 wherein the at least one ramp structure is attached to the rear side of the signal connector panel.

10. The apparatus according to claim 7 wherein the at least one ramp structure comprises a plurality of ramp structures and the at least one roller member comprises a plurality of roller members, wherein each roller member traverses the ramped surface of a corresponding ramped structure.

11. The apparatus according to claim 4 further comprising a plurality of support rail shaft structures attached to the housing support structure, each support rail shaft structure including a rail shaft portion, the signal connector panel further including a plurality of linear sleeve bearing structures, each linear sleeve bearing structure having a linear sleeve bearing that is sized and configured to receive a corresponding rail shaft portion so as to allow the signal connector panel to be moved in the outward direction or in the inward direction.

12. The apparatus according to claim 11 wherein the signal connector panel includes a pair of sidewall structures and wherein two linear sleeve bearing structures are attached to each sidewall structure.

13. The apparatus according to claim 4 further comprising a plurality of support rail shaft structures attached to the housing support structure, each support rail shaft structure including a rail shaft portion, and wherein the frame member includes a plurality of linear sleeve bearing structures, each linear sleeve bearing structure having a linear sleeve bearing therein that is sized and configured to receive a corresponding one of the rail shaft portions so as to allow the frame member to exhibit linear movement in the first direction and the second direction.

14. The apparatus according to claim 1 wherein the spring operated device comprises:
  a stem section having a first end attached to the signal connector panel and an opposite second end, the stem section extending through an opening in the housing support structure;
  a cap member attached to the second end of the stem section; and
  a spring member on the stem section and interposed between the a portion of the housing support structure and the cap member so as to constantly urge the signal connector panel in the opposite inward direction.

15. The apparatus according to claim 14 wherein the cap member is removably attached to the second end of the stem section.

16. The apparatus according to claim 1 further including at least one kinematic mount attached to the front side and configured to engage a complementary mating surface on another body.

17. The apparatus according to claim 16 wherein the kinematic mount has a triangular cross-section, an apex and a base, wherein the base of the kinematic mount is attached to the front side.

18. The apparatus according to claim 16 wherein the at least one kinematic mount comprises a plurality of kinematic mounts.

19. The apparatus according to claim 18 wherein the kinematic mounts are equidistantly spaced.

20. An apparatus for aligning and connecting complementary signal connectors on two different bodies, comprising:
  a housing including a housing support structure, a front side and a rear side;
  an interface attached to the housing and configured to interface with a robotic end-effector that produces rotational forces in the clockwise and counter-clockwise directions;

a first drive system having a drive end operably supported by the interface and a body engagement portion that is operably supported by the housing support structure and configured to physically connect to another body, wherein a first rotational force imparted to the drive end causes the body engagement portion to emerge from the housing so as to physically connect to another body and a second rotational force opposite to the first rotational force is imparted to the drive end causes the body engagement portion to disengage from the other body and withdraw into the housing;

a signal connector panel including at least one signal connector and movably attached to the housing support structure such that the signal connector panel is movable in an outward direction with respect to the front side of the housing so that the signal connector mates with a complementary signal connector on another body and is movable in an opposite inward direction so that the signal connector is disconnected from the complementary mating connector;

a spring operated device attached to the signal connector panel and operably supported by the housing support structure to constantly urge the signal connector panel in the opposite inward direction;

a mechanism movably attached to the housing support structure and in constant physical contact with the signal connector panel, the mechanism being movable in a first direction in order to displace the signal connector panel in the outward direction and movable in an opposite second direction to cause retraction of the signal connector panel in the inward direction so as to disconnect the signal connector from the complementary signal connector on the other body;

a second drive system operably attached to the mechanism and operably supported by the interface, the second drive system moving the mechanism in the first direction when a third rotational force is imparted to the second drive system and in the opposite second direction when a fourth rotational force that is opposite to the third rotational force is imparted to the second drive system;

a mechanical link member having a first portion pivotally attached to the opposite distal end of the arm member and a second portion operably attached to the second drive system, wherein the mechanical link member and the arm member cooperate to convert rotational motion of the second drive system into linear movement of the mechanism; and a plurality of kinematic mounts attached to the front side of the housing.

\* \* \* \* \*